US012802993B2

(12) United States Patent
Chu et al.

(10) Patent No.: US 12,802,993 B2
(45) Date of Patent: Nov. 17, 2026

(54) BINDER AND LITHIUM-ION BATTERY INCLUDING SAME

(71) Applicant: ZHUHAI COSMX BATTERY CO., LTD., Zhuhai (CN)

(72) Inventors: Lin Chu, Zhuhai (CN); Suli Li, Zhuhai (CN); Weiping Chen, Zhuhai (CN); Panlong Guo, Zhuhai (CN)

(73) Assignee: ZHUHAI COSMX BATTERY CO., LTD., Zhuhai (CN)

(*) Notice: Subject to any disclaimer, the term of this patent is extended or adjusted under 35 U.S.C. 154(b) by 489 days.

(21) Appl. No.: 18/398,572

(22) Filed: Dec. 28, 2023

(65) Prior Publication Data

US 2024/0413334 A1 Dec. 12, 2024

Related U.S. Application Data

(63) Continuation of application No. PCT/CN2022/127483, filed on Oct. 25, 2022.

(30) Foreign Application Priority Data

Oct. 25, 2021 (CN) ......................... 202111243142.7

(51) Int. Cl.
*H01M 4/62* (2006.01)
*H01M 10/0525* (2010.01)
*H01M 4/02* (2006.01)

(52) U.S. Cl.
CPC ....... *H01M 4/622* (2013.01); *H01M 10/0525* (2013.01); *H01M 2004/021* (2013.01); *H01M 2004/027* (2013.01)

(58) Field of Classification Search
CPC ............. H01M 4/622; H01M 10/0525; H01M 2004/021; H01M 2004/027

(Continued)

(56) References Cited

U.S. PATENT DOCUMENTS

| | | | |
|---|---|---|---|
| 4,229,366 | A | 10/1980 | Toke et al. |
| 2003/0087338 | A1 | 5/2003 | Messersmith et al. |

(Continued)

FOREIGN PATENT DOCUMENTS

| | | | |
|---|---|---|---|
| CN | 101065134 | A | 10/2007 |
| CN | 101974150 | A | 2/2011 |

(Continued)

OTHER PUBLICATIONS

Aikaterini et al., A Novel and Efficient Synthesis of 3,4-Dihydroxyphenylacetic Ester and Amide Derivatives/Conjugates and Assessment of their Antioxidant Activity, Natural Product Research, pp. 1-7, dated Jun. 18, 2017.

(Continued)

*Primary Examiner* — James M Erwin
(74) *Attorney, Agent, or Firm* — Westbridge IP LLC

(57) ABSTRACT

Disclosed are a binder and a lithium-ion battery including the binder. The binder includes at least one polymer, and the polymer has a structure shown in Formula 1. The binder utilizes a composite structure in which a main chain is polyethylene glycol and both ends of a polymer chain include catechol, which respectively provide the binder with high ionic conductivity and high adhesion. A negative electrode plate including the binder features relatively has high ionic conductivity and peel strength. In addition, the binder in the present disclosure is used in a lithium-ion battery, and the lithium-ion battery has a higher cycle capacity retention rate, a lower cycle expansion rate, and higher rate performance than a lithium-ion battery using a conventional polymer binder.

(Continued)

(A)

(B)

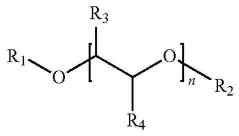

20 Claims, 2 Drawing Sheets

(58) Field of Classification Search
USPC .......................................................... 429/217
See application file for complete search history.

(56) References Cited

U.S. PATENT DOCUMENTS

| | | | |
|---|---|---|---|
| 2011/0130465 A1 | 6/2011 | Dalsin et al. | |
| 2016/0289392 A1* | 10/2016 | Grubbs | C08L 87/005 |
| 2023/0170468 A1* | 6/2023 | Hansen | C09C 3/08 429/217 |

FOREIGN PATENT DOCUMENTS

| | | | | |
|---|---|---|---|---|
| CN | 103500835 A | | 1/2014 | |
| CN | 108178730 A | | 6/2018 | |
| CN | 108886148 A | | 11/2018 | |
| CN | 111138579 A | * | 5/2020 | H01M 4/133 |
| CN | 111777759 A | | 10/2020 | |
| CN | 112442140 A | | 3/2021 | |
| CN | 113368080 A | | 9/2021 | |
| CN | 113980629 A | | 1/2022 | |
| JP | S60260532 A | | 12/1985 | |
| JP | H01283565 A | | 11/1989 | |
| KR | 20210004138 A | * | 1/2021 | H01M 10/4235 |
| WO | 2021119853 A1 | | 6/2021 | |

OTHER PUBLICATIONS

First Office Action issued in counterpart Chinese Patent Application No. 202111243142.7, dated Jan. 28, 2023.
International Search Report issued in corresponding PCT Application No. PCT/CN2022/127483, dated Jan. 18, 2023.
Lee et al., Synthesis and Gelation of DOPA-Modified Poly(ethylene glycol) Hydrogels, Biomacromolecules, 2002, vol. 3, No. 5, pp. 1038-1047, dated Jul. 4, 2002.
Lin et al., An Overview on Study in Mussel Foot-Byssus Protein Mimetic Polymers, Polymer Bulletin, No. 1, pp. 1-16, dated Jan. 31, 2020.
Written Opinion issued in corresponding PCT Application No. PCT/CN2022/127483, dated Jan. 18, 2023.
Xiong et al., Progress in Synthesis of Polyethylene Glycol Derivatives, Polymer Bulletin, No. 1, pp. 39-45, dated Mar. 31, 2000.
Yue et al., Advances of Binder for Silicone-based Anode in Lithium Ion Batteries, Chinese Battery Industry, vol. 21, No. 1, pp. 31-44, dated Feb. 28, 2017.

* cited by examiner (A) (B)

BINDER AND LITHIUM-ION BATTERY INCLUDING SAME

CROSS-REFERENCE TO RELATED APPLICATIONS

The present disclosure is a continuation of International Application No. PCT/CN2022/127483, filed on Oct. 25, 2022, which claims priority to Chinese Patent Application No. 202111243142.7, filed on Oct. 25, 2021. All of the aforementioned applications are hereby incorporated by reference in their entireties.

TECHNICAL FIELD

The present disclosure relates to a binder and a lithium-ion battery including the binder, and belongs to the technical field of lithium-ion batteries, and specifically, to the technical field of negative electrode binders for lithium-ion batteries.

BACKGROUND

Charging and discharging processes of a lithium-ion battery correspond to intercalation and deintercalation processes of lithium ions in an interlayer of a negative electrode material (such as graphite) or in a silicon negative electrode material. As a cycling period increases, expansion of a negative electrode also gradually increases, which leads to reduction of an effective bonding network, such as reduction of an effective bonding network between active materials or between an active material and a current collector. The reduction of the effective bonding network also leads to reduction of a conductive network inside a battery, and ultimately, a capacity retention rate of the battery also decreases.

Therefore, it is particularly important to applications of batteries to invent a high-adhesion binder that can effectively suppress expansion and improve ionic conductivity.

SUMMARY

To improve disadvantages of the prior art, especially problems of insufficient adhesion and low ionic conductivity of conventional negative electrode binders in the prior art, the present disclosure provides a binder and a lithium-ion battery including the binder. The binder is a polymer, a main chain of the polymer is polyethylene glycol, and at least one end of a polymer chain includes catechol. Such two structural units provide the binder with advantages of high ionic conductivity and high adhesion.

The present disclosure provides a binder. The binder includes at least one polymer, and the polymer has a structure shown in Formula 1:

Formula 1

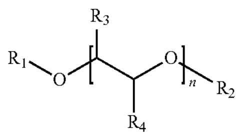

In Formula 1, $R_3$ and $R_4$ are identical or different, and are independently selected from H, alkyl, substituted alkyl, or halogen, and n represents a quantity of repeated units and is an integer ranging from 20 to 1000.

End-capping groups $R_1$ and $R_2$ at both ends are identical or different, and are independently selected from H or a catechol group shown in Formula 2, and $R_1$ and $R_2$ are not both H:

Formula 2

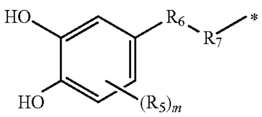

In Formula 2, $R_5$ is selected from at least one of alkyl, alkoxy, amine, aryl, or a halogen atom;

m is selected from 0, 1, 2, or 3;

$R_6$ is selected from an alkylene group, or an atom or a group forming a hybrid orbital, or does not exist;

$R_7$ is selected from —C(═O)— or —S(═O)(═O)—; and

* represents a linking end.

In an embodiment, $R_3$ and $R_4$ are identical and are both H, and a main chain of the polymer is polyethylene glycol.

In an embodiment, n is 20, 50, 100, 200, 500, 800, or 1000. Preferably, n is an integer ranging from 50 to 200.

In an embodiment, in Formula 1, $R_1$ and $R_2$ are identical or different, and are independently selected from one of H or groups having structures shown in Formula 2-1 to Formula 2-8, and $R_1$ and $R_2$ are not both H:

2-1

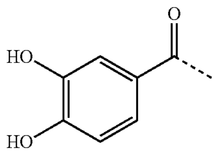

2-2

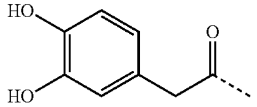

2-3

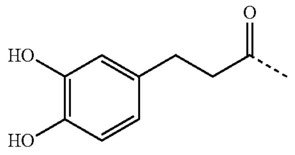

2-4

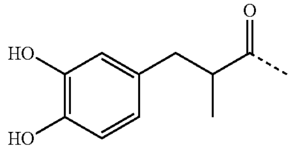

2-5

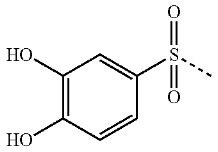

-continued 2-6

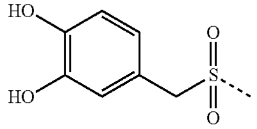

2-7

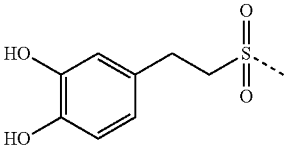

2-8

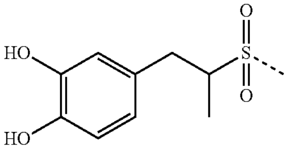

In an embodiment, in Formula 1, $R_1$ and $R_2$ are identical or different, and are independently selected from one of groups having structures shown in Formula 3-1 to Formula 3-4, and $R_1$ and $R_2$ are not both H:

3-1

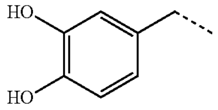

3-2

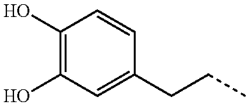

3-3

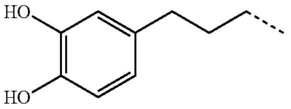

3-4

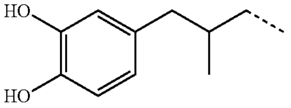

In an embodiment, in Formula 2, $R_6$ may include an atom or group forming a hybrid orbital, such as —O—, —S—, —NH—, or

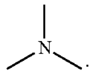

.

In an embodiment, in Formula 1, $R_1$ and $R_2$ are identical or different, and are independently selected from groups having structures shown in Formula 4-1 to Formula 4-8, and $R_1$ and $R_2$ are not both H:

4-1

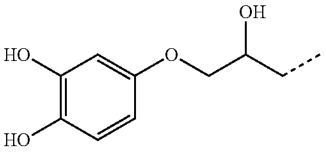

4-2

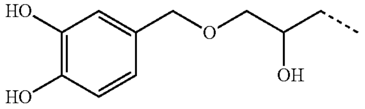

4-3

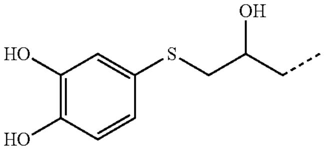

4-4

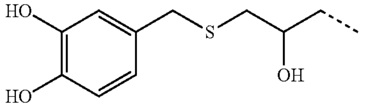

4-5

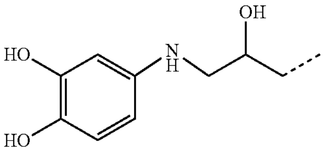

4-6

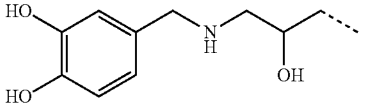

4-7

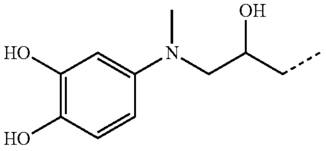

4-8

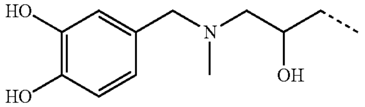

In an embodiment, a weight-average molecular weight of the binder ranges from $5\times10^3$ to $1{,}000\times10^4$.

In an embodiment, a glass-transition temperature of the binder is −70° C. to −40° C.

In an embodiment, an ionic conductivity of the binder ranges from $10^{-6}$ S·cm$^{-1}$ to $10^{-4}$ S·cm$^{-1}$.

In an embodiment, the binder is a solution-type binder such as a water-soluble binder, and a solid content of the binder ranges from 4 wt % to 25 wt %.

In an embodiment, a viscosity of the solution binder ranges from 500 mPa·s to 100,000 mPa s.

The present disclosure further provides a negative electrode plate. The negative electrode plate includes a negative electrode current collector and a negative electrode active layer located on at least one side of the current collector, the negative electrode active layer includes a first binder, and the first binder is selected from the binder described above.

In an embodiment, the negative electrode active layer further includes a second binder.

For example, the second binder is selected from at least one of an SBR (styrene-butadiene rubber) emulsion, a styrene-acrylic emulsion, or a polyacrylic acid binder.

In an embodiment, a total mass of the first binder and the second binder accounts for 0.5 wt % to 5 wt % of a total solid mass of a negative electrode slurry. Herein, "total solid mass" means a total mass of solid components in the negative electrode slurry after a solvent is removed.

In an embodiment, a mass of the first binder accounts for 10% to 90% of a total mass of the first binder and the second binder.

The present disclosure further provides a lithium-ion battery. The lithium-ion battery includes the binder described above, and/or the lithium-ion battery includes the negative electrode plate described above.

Beneficial effects are as follows.

The present disclosure provides a binder, and a negative electrode plate and a lithium-ion battery that include the binder. The binder has a composite structure in which a main chain is polyethylene glycol and at least one end of a polymer chain includes catechol, which respectively provide the binder with advantages of high ionic conductivity and high adhesion. In this way, a negative electrode plate including the binder features relatively has high ionic conductivity and peel strength. Moreover, when there are hydroxyl groups only at both ends and no hydroxyl groups in a side chain, the binder has so few hydroxyl groups that almost no hydrogen radicals are generated, and no damage is caused to a negative electrode. In addition, the binder in the present disclosure is used in a lithium-ion battery, and the lithium-ion battery provided in the present disclosure has a higher cycle capacity retention rate, a lower cycle expansion rate, and higher rate performance than a lithium-ion battery using a conventional polymer binder.

DETAILED DESCRIPTION OF THE EMBODIMENTS

[Binder]

The present disclosure provides a binder. The binder includes at least one polymer, and the polymer has a structure shown in Formula 1:

Formula 1

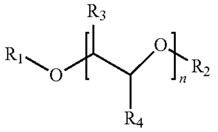

In Formula 1, $R_3$ and $R_4$ are identical or different, and are independently selected from H, alkyl, substituted alkyl, or halogen, and n represents a quantity of repeated units and is an integer ranging from 20 to 1000.

End-capping groups $R_1$ and $R_2$ at both ends are identical or different, and are independently selected from H or a catechol group shown in Formula 2, and $R_1$ and $R_2$ are not both H:

Formula 2

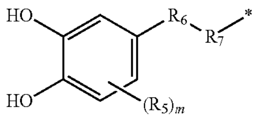

In Formula 2, $R_5$ is selected from at least one of alkyl, alkoxy, amine, aryl, or a halogen atom;

m is selected from 0, 1, 2, or 3;

$R_6$ is an alkylene group, or an atom or a group forming a hybrid orbital, or does not exist, where the alkylene group is, for example, a $C_{1-6}$ alkylene group, or is, for another example, methylene, ethylidene, N-propylidene, or isopropylidene; and the atom or group forming a hybrid orbital is, for example, —O—, —S—, —NH—, or

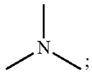

;

$R_7$ is selected from —C(=O)— or —S(=O)(=O)—; and

* represents a linking end.

In an embodiment, $R_3$ and $R_4$ are identical and are both H, and a main chain of the polymer is polyethylene glycol.

In an embodiment, n is 20, 50, 100, 200, 500, 800, or 1000. Preferably, n is an integer ranging from 50 to 200.

Figure 1:
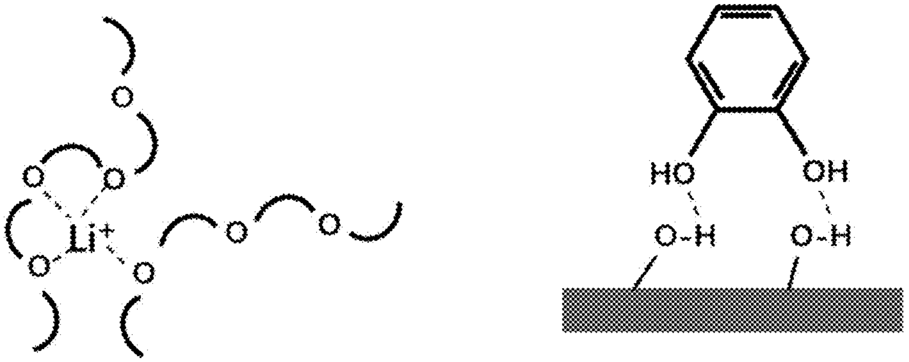
FIG. 1 is a schematic diagram of transporting lithium ions by a binder according to the present disclosure.

In an embodiment, a main structure of the polymer features a low glass-transition temperature, can swell in electrolyte solution, has a particular degree of flexibility, and can bend and move. Oxygen atoms in the main structure achieve transportation of lithium ions through a coordination-decoordination effect, as shown in (A) of FIG. 1.

In an embodiment, the end-capping group $R_1$ or $R_2$ or both include a structure of catechol, and a hydroxyl group on a benzene ring can form hydrogen bonds, making the polymer including this structure have strong adhesion and self-healing. For example, the polymer is used in a silicon negative electrode material. A surface of a silicon negative electrode and a surface of a current collector include many hydroxyl groups, and after the hydroxyl groups and hydroxyl groups on the benzene ring form hydrogen bonds, adhesion strength of an entire negative electrode binder may be improved. Moreover, when there are hydroxyl groups only at both ends and no hydroxyl groups in a side chain, the binder has so few hydroxyl groups that almost no hydrogen radicals are generated, and no damage is caused to a negative electrode. Refer to (B) in FIG. 1.

For example, $R_1$ and $R_2$ are identical or different, and are independently selected from but not limited to one of H or groups having structures shown in Formula 2-1 to Formula 2-8, and $R_1$ and $R_2$ are not both H:

2-1

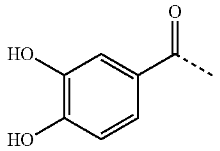

2-2

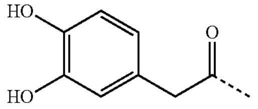

2-3

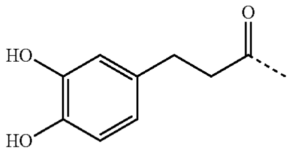

2-4

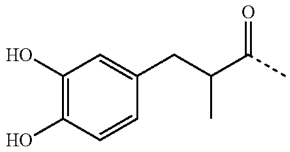

2-5

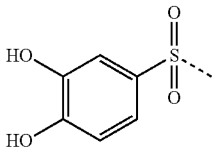

2-6

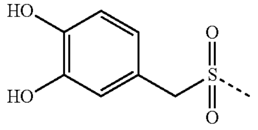

2-7

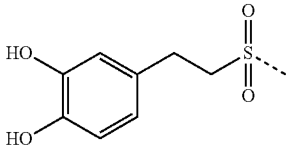

2-8

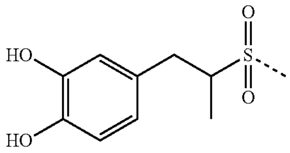

For example, $R_1$ and $R_2$ are identical or different, and are independently selected from but not limited to one of H or groups having structures shown in Formula 3-1 to Formula 3-4, and $R_1$ and $R_2$ are not both H:

3-1

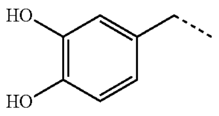

-continued 3-2

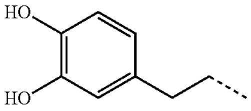

3-3

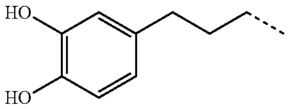

3-4

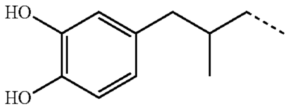

In a specific implementation, $R_6$ may include an atom or group forming a hybrid orbital, such as —O—, —S—, —NH—, or

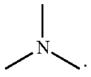

For example, $R_1$ and $R_2$ are identical or different, and are independently selected from but not limited to one of groups having structures shown in has Formula 4-1 to Formula 4-8, and $R_1$ and $R_2$ are not both H:

4-1

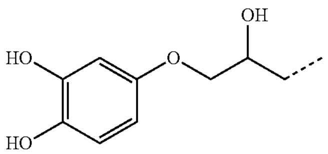

4-2

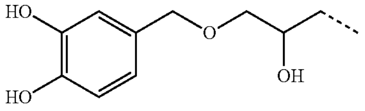

4-3

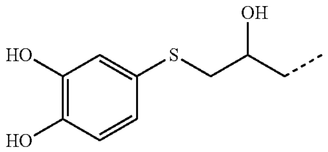

4-4

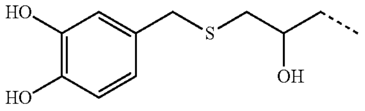

4-5

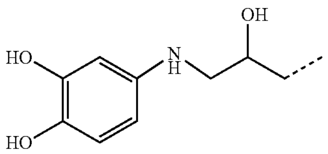

4-6

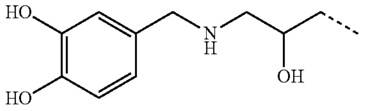

-continued 4-7

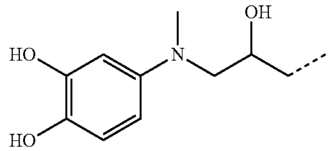

4-8

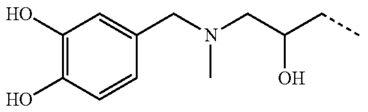

In a specific implementation, a weight-average molecular weight of the binder ranges from $5\times10^3$ to $1,000\times10^4$, and for example, ranges from $5\times10^3$ to $25\times10^4$, or, for another example, ranges from $25\times10^4$ to $50\times10^4$, $50\times10^4$ to $100\times10^4$, $100\times10^4$ to $400\times10^4$, $400\times10^4$ to $600\times10^4$, or $600\times10^4$ to $1000\times10^4$; and preferably ranges from $25\times10^4$ to $100\times10^4$.

In a specific implementation, a glass-transition temperature of the binder is −70° C. to −40° C.

In a specific implementation, an ionic conductivity of the binder ranges from $10^{-6}$ $S\cdot cm^{-1}$ to $10^{-4}$ $S\cdot cm^{-1}$.

In a specific implementation, the binder is a solution-type binder such as a water-soluble binder, and a solid content of the binder ranges from 4 wt % to 25 wt %, for example, is 4 wt %, 6 wt %, 8 wt %, 10 wt %, 12 wt %, 14 wt %, 16 wt %, 18 wt %, 20 wt %, 22 wt %, 24 wt %, or 25 wt %.

In a specific implementation, a viscosity of the solution binder ranges from 500 mPa·s to 100,000 mPa·s, for example, is 500 mPa·s, 1500 mPa·s, 2500 mPa·s, 5000 mPa·s, 7500 mPa·s, 15,000 mPa·s, 25,000 mPa·s, 35,000 mPa·s, 45,000 mPa·s, 55,000 mPa·s, 65,000 mPa·s, 75,000 mPa·s, 85,000 mPa·s, or 95,000 mPa·s.

[Negative Electrode Plate]

The present disclosure further provides a negative electrode plate. The negative electrode plate includes a negative electrode current collector and a negative electrode active layer located on at least one side of the current collector, the negative electrode active layer includes a first binder, and the first binder is selected from the binder described above.

In a specific implementation, the negative electrode current collector is selected from at least one of a single-sided glossy copper foil, a double-sided glossy copper foil, or a porous copper foil.

In a specific implementation, the negative electrode active layer is provided by a negative electrode slurry, and the negative electrode slurry includes the foregoing binder.

In a specific implementation, a mass of the first binder accounts for 0.5 wt % to 5 wt % of a total solid mass of the negative electrode slurry, which preferably ranges from 0.8 wt % to 2.5 wt %, and more preferably ranges from 1.5 wt % to 2.5 wt %.

In a specific implementation, the negative electrode slurry further includes a second binder.

Preferably, the second binder is selected from at least one of an SBR emulsion, a styrene acrylic emulsion, or a polyacrylic acid binder, and for example, is polyacrylic acid ester.

In a specific implementation, the negative electrode slurry includes a first binder and a second binder. Preferably, a total mass of the first binder and the second binder accounts for 0.5 wt % to 5 wt % of a total solid mass of the negative electrode slurry, which preferably ranges from 0.8 wt % to 2.5 wt %, and more preferably ranges from 1.5 wt % to 2.5 wt %.

Further, preferably, a mass of the first binder accounts for 10% to 90% of the total mass of the first binder and the second binder.

In a specific implementation, the negative electrode slurry further includes a negative electrode active material and/or an additive.

In a specific implementation, the negative electrode active material is selected from at least one of artificial graphite, natural graphite, mesophase carbon microbead, lithium titanate, silicon oxide, silicon nanopowder, silicon monoxide, or silicon carbon.

In a specific implementation, the additive includes a conductive agent and/or a dispersing agent.

Preferably, the conductive agent is selected from at least one of graphite, carbon black, acetylene black, graphene, or carbon nanotubes.

Preferably, the dispersing agent is selected from sodium carboxymethyl cellulose and/or lithium carboxymethyl cellulose.

Preferably, an amount of the conductive agent or an amount of the dispersing agent in the present disclosure or both are amounts known in the art.

In a specific implementation, the negative electrode plate includes a negative electrode current collector and a negative electrode active layer located on at least one side of the negative electrode current collector, and the negative electrode active layer includes at least a negative electrode active material and the first binder.

The present disclosure further provides a method for preparing the electrode plate, including the following step: applying a negative electrode slurry including the first binder onto at least one side of the negative electrode current collector, to obtain the negative electrode plate.

In a specific implementation, the method for preparing the negative electrode plate specifically includes the following steps:

(1) evenly mixing a negative electrode active material (for example, artificial graphite: 96 wt %), a conductive agent (for example, carbon black: 0.5 wt %), a dispersing agent (sodium carboxymethyl cellulose: 0.5 wt %), the first binder (1.6 wt %), and an SBR emulsion (1.4 wt %), to obtain a negative electrode slurry; and (2) applying the negative electrode slurry onto one side of the negative electrode current collector, followed by oven drying, to obtain the negative electrode plate.

[Lithium-Ion Battery]

The present disclosure further provides a lithium-ion battery. The lithium-ion battery includes the binder described above and/or the negative electrode plate described above.

In a specific implementation, the lithium-ion battery further includes a positive electrode plate, a separator, and an electrolyte solution. The positive electrode plate includes a positive electrode current collector and a positive electrode active layer located on at least one side of the current collector.

Preferably, the positive electrode current collector is selected from at least one of a single-sided glossy aluminum foil, a double-sided glossy aluminum foil, or a porous aluminum foil.

In a specific implementation, the positive electrode active layer is provided by a positive electrode slurry.

Preferably, the positive electrode slurry includes a positive electrode active material and/or an additive.

Preferably, the positive electrode active material is selected from at least one of lithium iron phosphate, a ternary positive electrode material, or lithium cobalt oxide.

Preferably, the additive includes a conductive agent and/or a positive electrode binder. For example, the conductive agent is selected from at least one of graphite, carbon black, acetylene black, graphene, or carbon nanotubes. For example, the positive electrode binder is selected from at least one of polyvinylidene fluoride (PVDF), polyacrylic acid ester, or polyacrylic acid, and is preferably PVDF.

In an embodiment, the positive electrode plate is prepared through the following steps:

(1) evenly mixing a positive electrode active material, a conductive agent, and a positive electrode binder, to obtain a positive electrode slurry; and (2) applying the positive electrode slurry onto one side of the positive electrode current collector, followed by oven drying, to obtain the positive electrode plate.

In the present disclosure, a mass ratio of the positive electrode active material, the conductive agent, and the positive electrode binder is not specifically limited, and may use a mass ratio commonly used in the art. For example, the mass ratio of the positive electrode active material, the conductive agent, and the positive electrode binder may be 97.5:1.4:1.1. For example, a mass ratio of lithium cobalt oxide, carbon black, and PVDF is 97.5:1.4:1.1.

In an example, the lithium-ion battery includes a positive electrode plate, a separator, a negative electrode plate, and an electrolyte solution. For example, the positive electrode plate, the negative electrode plate, and the separator are assembled into a battery cell through winding or stacking, and then packaged with an aluminum-plastic film. Then the lithium-ion battery is obtained by oven drying, injection with an electrolyte solution, battery formation, and secondary sealing in sequence.

The technical solutions of the present disclosure are further described in detail below with reference to specific embodiments. It should be understood that the following embodiments are merely for the purposes of illustrating and explaining the present disclosure, and shall not be construed as limiting the protection scope of the present disclosure. Any technology implemented based on the foregoing content of the present disclosure falls within the intended protection scope of the present disclosure.

Unless otherwise stated, raw materials and reagents used in the following embodiments are commercially available commodities, or may be prepared by a known method.

Viscosities mentioned in the following Examples and Comparative Examples were measured by a digital rotational viscometer (Shanghai Sinocare NDJ-5S).

Glass-transition temperatures mentioned in the following Examples and Comparative Examples were measured by a differential scanning calorimeter (DSC), whose model is 910s (from the company of TA Instruments in USA).

Ionic conductivities of adhesive films in the following Examples and Comparative Examples were obtained through testing as follows. A binder solution was spread on a polytetrafluoroethylene plate and dried to obtain a binder film. Conductivity of the binder film at a room temperature of 25° C. was tested by using a Shanghai Chenhua CHI660E electrochemical workstation. A stainless steel electrode was used as a working electrode, and another stainless steel electrode was used as a counter electrode and a reference electrode. A test frequency ranges from 1 Hz to $10^6$ Hz, and an amplitude is 10 mV. Resistance of the binder film is obtained according to an obtained Electrochemical impedance spectrogram, and an ionic conductivity may be calculated according to the following formula: $\sigma=L/(RA)$, where A represents an area ($cm^2$) of the binder film, L represents a thickness (cm) of the film, and R is ohmic impedance measured by Electrochemical Impedance Spectroscopy (EIS).

Example 1

Positive electrode plate: A positive electrode active material lithium cobalt oxide, a binder PVDF, and conductive carbon black were dispersed in N-methyl pyrrolidone. After stirring, a uniformly dispersed positive electrode slurry was obtained, where solid components included lithium cobaltate oxide with 97.5 wt %, PVDF with 1.1 wt %, and conductive carbon black with 1.4 wt %. A solid content of the positive electrode slurry was 66.3 wt %, and a viscosity was 20300 mPa·s. The positive electrode slurry was evenly coated on surfaces of two sides of an aluminum foil with a thickness of 9 m. The positive electrode slurry was dried at 100° C. to 130° C. for four hours and then was compacted with a roller press, to obtain the positive electrode plate with a press density ranging from 3.5 $g/cm^3$ to 4.2 $g/cm^3$.

Negative Electrode Plate:

1. Preparation of a negative electrode binder: A polymer shown in Formula 1 is included, where a main structure was a main chain of polyethylene glycol, $R_1$ and $R_2$ had identical structures, structures of $R_1$ and $R_2$ were shown in Table 1, a weight-average molecular weight was 403,000, a glass-transition temperature was −51° C., and an ionic conductivity was $4.5\times10^{-5}$ $S\cdot cm^{-1}$. The negative electrode binder was a solution, where a solvent was water, a solid content was 6 wt %, and a viscosity was 5060 mPa·s.

Figure 3:
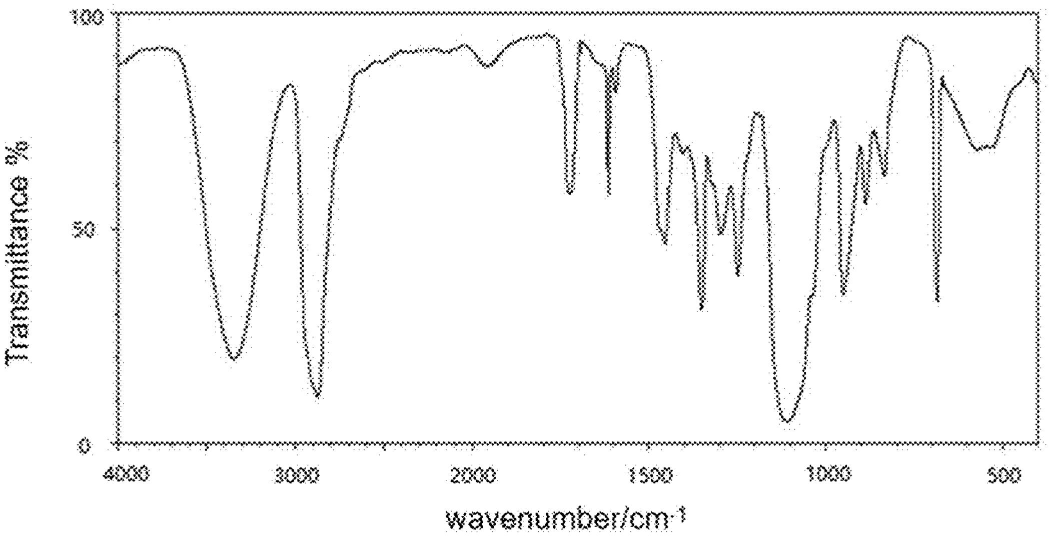
FIG. 3 is an infrared spectrogram of a polymer shown by Formula 1 in Preparation Example 1.

A method for preparing the polymer shown in Formula 1 was as follows. Polyethylene glycol with a molecular weight of 400,000 was dissolved in water, a pH value was adjusted to range of 8 to 9 with sodium hydroxide, and at a low temperature of 0° C. to 5° C., an acetone solution with 3,4-dimethoxybenzoyl chloride dissolved was dropwise added. The solution was stirred for six hours for reaction. After the reaction was completed, diethyl ether was added to precipitate a polymer, and the polymer was extracted by filtration. After drying, the polymer was dissolved in water again, and dilute hydrochloric acid was added for reaction at 50° C. for one hour to obtain a target polymer. FIG. 3 is an infrared spectrogram of the target polymer. It can be seen from the figure that there is an obvious characteristic peak of an ether bond at 1200 $cm^{-1}$, originating from a polyethylene glycol main chain, characteristic peaks of a benzene ring are presented at both 1600 $cm^{-1}$ and 700 $cm^{-1}$, and a characteristic peak of an ester bond is presented at 1730 $cm^{-1}$. This confirms that the polymer has the foregoing structure.

2. Preparation of a negative electrode plate: The binder, an SBR emulsion, graphite, a dispersing agent sodium carboxymethyl cellulose (CMC), and conductive carbon black were mixed and dispersed in deionized water to obtain a negative electrode slurry. A solid content of the negative electrode slurry was 43.5 wt %, and a viscosity was 4610 mPa·s. Solid components included graphite-silicon monoxide (graphite:silicon monoxide=9:1) with 96.5 wt %, CMC with 0.5 wt %, conductive carbon black with 0.5 wt %, a binder with 1.5 wt %, and SBR emulsion with 1 wt %. The negative electrode slurry was evenly coated on surfaces of two sides of a copper foil with a thickness of 6 μm. The negative electrode slurry was dried at 70° C. to 100° C. for five hours, and then was compacted with a roller press, to obtain the negative electrode plate with a press density ranging from 1.5 g/cm$^3$ to 1.8 g/cm$^3$.

3. Preparation of a lithium-ion battery: After tabs were welded on the positive electrode plate and the negative electrode plate, they were wounded together with a separator (a PP/PE/PP composite film with a thickness of 9 m and porosity of 41%), to form a battery cell. The battery cell was packaged, and then injected with an electrolyte solution (a binary solvent with a volume ratio of dimethyl carbonate to ethylene carbonate of 1:1 includes 1 mol/L lithium hexafluorophosphate, and fluoroethylene carbonate with 10 wt % was added as an additive). After battery formation, hot pressing, and secondary sealing, the lithium-ion battery was obtained.

Example 2

1. Preparation of a negative electrode binder: It contained a polymer shown in Formula 1, where a main structure was a main chain of polyethylene glycol, structures of $R_1$ and $R_2$ were shown in Table 1, a weight-average molecular weight was 345,000, a glass-transition temperature was −45° C., and an ionic conductivity was $4.2\times10^{-5}$ S·cm$^{-1}$. The negative electrode binder was a solution, where a solvent was water, a solid content was 8 wt %, and a viscosity was 6070 mPa·s.

A method for preparing the polymer in this example is consistent with that in Example 1, except that 3,4-dimethoxybenzoyl chloride in Example 1 is replaced with 3,4-dimethoxy benzene sulfonyl chloride.

2. Preparation of a negative electrode plate and a lithium-ion battery: Methods for preparing a positive electrode plate, a negative electrode plate, and a battery are the same as those in Example 1.

Example 3

1. Preparation of a negative electrode binder: It contained a polymer shown in Formula 1, where a main structure was a main chain of polyethylene glycol, structures of $R_1$ and $R_2$ were shown in Table 1, a weight-average molecular weight was 554,000, a glass-transition temperature was −42° C., and an ionic conductivity was $4.6\times10^{-5}$ S·cm$^{-1}$. The negative electrode binder was a solution, where a solvent was water, a solid content was 7.5 wt %, and a viscosity was 7280 mPa·s.

Method for preparing the polymer: The method for preparing the polymer in this example is consistent with that in Example 1, except that 3,4-dimethoxybenzoyl chloride in Example 1 is replaced with 3,4-dimethyl oxybenzyl chloride.

2. Preparation of a negative electrode plate and a lithium-ion battery: Methods for preparing a positive electrode plate, a negative electrode plate, and a battery are the same as those in Example 1.

Example 4

1. Preparation of a negative electrode binder: It contained a polymer shown in Formula 1, where a main structure was a main chain of polyethylene glycol, structures of $R_1$ and $R_2$ were shown in Table 1, a weight-average molecular weight was 643,000, a glass-transition temperature was −39° C., and an ionic conductivity was $3.8\times10^{-5}$ S·cm$^{-1}$. The negative electrode binder was a solution, where a solvent was water, a solid content was 11 wt %, and a viscosity was 10800 mPa·s.

Method for preparing the polymer: The method for preparing the polymer in this example is consistent with that in Example 1, except that 3,4-dimethoxybenzoyl chloride in Example 1 is replaced with 3,4-dimethoxybenzylidene glycidyl ether.

2. Preparation of a negative electrode plate and a lithium-ion battery: Methods for preparing a positive electrode plate, a negative electrode plate, and a battery are the same as those in Example 1.

Example 5

1. Preparation of a negative electrode binder: which is consistent with that in Example 1, except that in Formula 1, end-capping groups $R_1$ and $R_2$ are different, where $R_1$ is H, $R_2$ is (2-1)

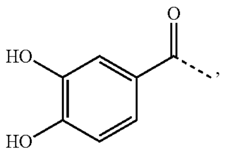

a weight-average molecular weight is 421,000, a glass-transition temperature is −50° C., a solid content is 6 wt %, a viscosity is 4850 mPa·s, and an ionic conductivity is $3.9\times10^{-5}$ S·cm$^{-1}$.

2. Preparation of a negative electrode plate and a lithium-ion battery: Methods for preparing a positive electrode plate, a negative electrode plate, and a battery are the same as those in Example 1.

Example 6

1. Preparation of a negative electrode binder: which is consistent with that in Example 1, except that in Formula 1, end-capping groups $R_1$ and $R_2$ are different, where $R_1$ is (2-5)

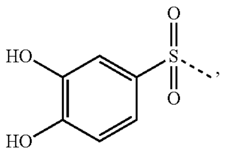

$R_2$ is H, a weight-average molecular weight is 330,000, a glass-transition temperature is −46° C., a solid content is 8 wt %, a viscosity is 5870 mPa·s, and an ionic conductivity is $3.8\times10^{-5}$ S·cm$^{-1}$.

2. Preparation of a negative electrode plate and a lithium-ion battery: Methods for preparing a positive electrode plate, a negative electrode plate, and a battery are the same as those in Example 1.

Example 7

1. Preparation of a negative electrode binder: which is consistent with that in Example 1, except that in Formula 1, group $R_3$ and $R_4$ are different, where $R_3$ is H, $R_4$ is $CH_3$, a weight-average molecular weight is 442,000, a glass-transition temperature is −50° C., a solid content is 6 wt %, a viscosity is 3800 mPa·s, and an ionic conductivity is $3.7\times10^{-5}$ S·cm$^{-1}$.

2. Preparation of a negative electrode plate and a lithium-ion battery: Methods for preparing a positive electrode plate, a negative electrode plate, and a battery are the same as those in Example 1.

Example 8

1. Preparation of a negative electrode binder: which is consistent with that in Example 1, except that in Formula 1, group $R_3$ and $R_4$ are different, where $R_3$ is $CH_2$ $CH_2Cl$, $R_4$ is H, a weight-average molecular weight is 435,000, a glass-transition temperature is −47° C., a solid content is 6 wt %, a viscosity is 3700 mPa·s, and an ionic conductivity is $3.8\times10^{-5}$ S·cm$^{-1}$.
2. Preparation of a negative electrode plate and a lithium-ion battery: Methods for preparing a positive electrode plate, a negative electrode plate, and a battery are the same as those in Example 1.

Comparative Example 1

1. Preparation of a negative electrode binder: which is consistent with that in Example 1, except that the negative electrode binder is polyethylene glycol, a weight-average molecular weight is 400,000, a glass-transition temperature is −53° C., a viscosity is 4050 mPa·s, and an ionic conductivity is $4.3\times10^{-5}$ S·cm$^{-1}$.
2. Preparation of a negative electrode plate and a lithium-ion battery: Methods for preparing a positive electrode plate, a negative electrode plate, and a battery are the same as those in Example 1.

Comparative Example 2

1. Preparation of a negative electrode binder: which is consistent with that in Example 2, except that the negative electrode binder is polyethylene glycol, a weight-average molecular weight is 430,000, a glass-transition temperature is −48° C., a viscosity is 5140 mPa·s, and an ionic conductivity is $4.1\times10^{-5}$ S·cm$^{-1}$.
2. Preparation of a negative electrode plate and a lithium-ion battery: Methods for preparing a positive electrode plate, a negative electrode plate, and a battery are the same as those in Example 1.

Comparative Example 3

1. Preparation of a negative electrode binder: which is consistent with that in Example 3, except that the negative electrode binder is polyethylene glycol, a weight-average molecular weight is 450,000, a glass-transition temperature is −44° C., a viscosity is 5890 mPa·s, and an ionic conductivity is $4.4\times10^{-5}$ S·cm$^{-1}$.
2. Preparation of a negative electrode plate and a lithium-ion battery: Methods for preparing a positive electrode plate, a negative electrode plate, and a battery are the same as those in Example 1.

Comparative Example 4

1. Preparation of a negative electrode binder: which is consistent with that in Example 4, except that the negative electrode binder is polyethylene glycol, a weight-average molecular weight is 480,000, a glass-transition temperature is −43° C., a viscosity is 8600 mPa·s, and an ionic conductivity is $3.7\times10^{-5}$ S·cm$^{-1}$.
2. Preparation of a negative electrode plate and a lithium-ion battery: Methods for preparing a positive electrode plate, a negative electrode plate, and a battery are the same as those in Example 1.

Comparative Example 5

A commercial LA136D binder (including no catechol) from the company of Indigo was used to replace the negative electrode binder in Example 1, with others remaining the same as those in Example 1, where an ionic conductivity of the negative electrode binder was $3.1\times10^{-6}$ S·cm$^{-1}$, a solution viscosity was 15000 mPa·s, a weight-average molecular weight was 640,000, and a glass-transition temperature was 130° C.

Test Example 1

(1) Peel strength mentioned in the foregoing Examples and Comparative Examples was obtained through testing as follows.

Figure 2:
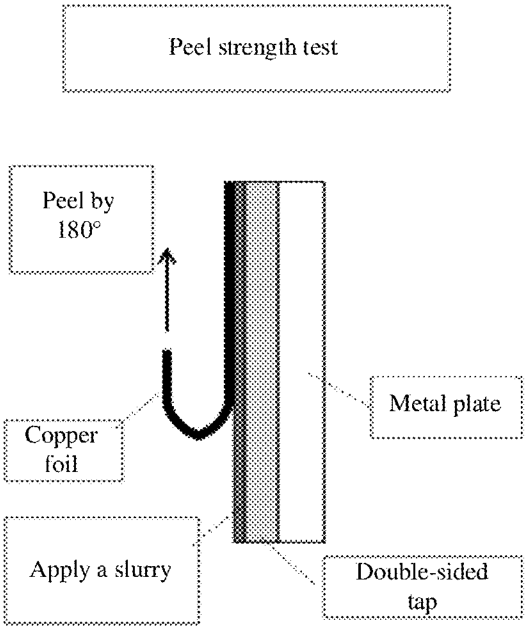
FIG. 2 is a schematic diagram of an apparatus for testing peel strength of an electrode plate according to the present disclosure.

Cutting the obtained negative electrode plate to obtain a test sample with a size of 20 mm×100 mm for subsequent use; bonding the electrode plate on a side that needs to be tested with a double-sided tape and compacting it with a roller press to completely fit the electrode plate; pasting the other side of the double-sided tape on the test sample to a surface of a stainless steel, bending one end of the test sample reversely by an angle of bending of 180°; using a high-strength tensile machine to fasten one end of the stainless steel to a lower clamp of the tensile tester, fastening the bending end of the sample to an upper clamp, adjusting an angle of the sample to ensure the upper end and the lower end to be kept in an upright position, and then stretching the sample at a speed of 50 mm/min until a negative electrode slurry is all peeled off from a substrate; and recording a displacement and force during the process, and using a force during stress balance as peel strength of the electrode plate. A testing apparatus is shown in FIG. 2, and test results are shown in Table 2.

(2) A capacity retention rate and an expansion rate mentioned in the foregoing Examples and Comparative Examples were obtained through testing as follows.

At a normal temperature of 25° C., performing charging/discharging at 0.7 C/0.5 C for 250 times, and calculating a battery capacity retention rate and a battery expansion rate after the charging/discharging for 250 times. Test results are shown in Table 2.

(3) C-Rate performance (rate discharging) mentioned in the foregoing Examples and Comparative Examples was obtained through testing as follows.

Discharging a fully charged battery to cut-off voltages at 0.2 C/0.5 C/1.0 C/1.5 C/2.0 C separately, and calculating a capacity retention rate (divided by a capacity retention rate of 0.2 C for discharging), that is, values of 0.5 C/0.2 C, 1.0 C/0.2 C, 1.5 C/0.2 C, and 2 C/0.2 C. Test results are shown in Table 3.

TABLE 1

| Structural formulas of $R_1$ and $R_2$ in Examples | | | |
|---|---|---|---|
| Example 1 | Example 2 | Example 3 | Example 4 |
| 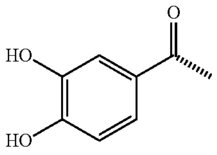 (2-1) | 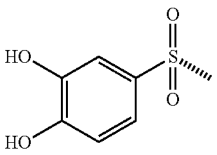 (2-5) | 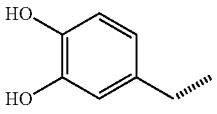 (3-1) | 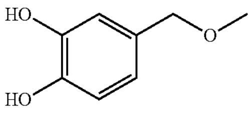 (4-2) |
| Example 5 | Example 6 | Example 7 | Example 8 |
| $R_1$ is H, and $R_2$ is 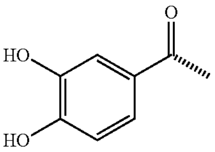 . (2-1) | $R_1$ is 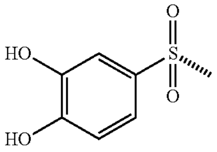 (2-5), and $R_2$ is H. | $R_3$ is H, and $R_4$ is $CH_3$. | $R_3$ is $CH_2CH_2Cl$, and $R_4$ is H. |

Note:
In Examples 1-4, $R_1$ and $R_2$ are identical, as shown in Table 1.

TABLE 2

| Peel strength of negative electrode plates and cycling performance of batteries prepared in Examples and Comparative Examples | | | |
|---|---|---|---|
| Group | Peel strength (N/m) | Capacity retention rate (%) | Expansion rate (%) |
| Example 1 | 20.8 | 97.3 | 5.5 |
| Comparative Example 1 | 15.6 | 92.1 | 8.6 |
| Example 2 | 27.0 | 97.1 | 6.4 |
| Comparative Example 2 | 12.5 | 90.9 | 8.8 |
| Example 3 | 19.8 | 94.9 | 5.9 |
| Comparative Example 3 | 13.5 | 90.7 | 9.2 |
| Example 4 | 25.0 | 96.3 | 4.8 |
| Comparative Example 4 | 16.6 | 90.4 | 6.8 |
| Comparative Example 5 | 19.7 | 91.0 | 8.3 |
| Example 5 | 16.1 | 93.2 | 7.4 |
| Example 6 | 16.8 | 93.4 | 7.9 |
| Example 7 | 16.9 | 94.6 | 6.1 |
| Example 8 | 17.2 | 95.7 | 6.2 |

TABLE 3

| C-rate performance of batteries prepared in Examples and Comparative Examples | | | | |
|---|---|---|---|---|
| Group | 0.5 C/0.2 C | 1 C/0.2 C | 1.5 C/0.2 C | 2 C/0.2 C |
| Example 1 | 96.47% | 94.25% | 90.41% | 86.68% |
| Comparative Example 1 | 91.62% | 89.61% | 83.25% | 82.24% |
| Example 2 | 96.77% | 93.94% | 91.02% | 86.88% |
| Comparative Example 2 | 93.34% | 90.31% | 88.49% | 82.14% |
| Example 3 | 96.77% | 93.54% | 90.31% | 87.39% |
| Comparative Example 3 | 91.42% | 87.49% | 83.55% | 80.73% |

TABLE 3-continued

| C-rate performance of batteries prepared in Examples and Comparative Examples | | | | |
|---|---|---|---|---|
| Group | 0.5 C/0.2 C | 1 C/0.2 C | 1.5 C/0.2 C | 2 C/0.2 C |
| Example 4 | 94.45% | 92.23% | 89.30% | 85.87% |
| Comparative Example 4 | 90.31% | 88.29% | 85.67% | 80.42% |
| Comparative Example 5 | 91.93% | 89.00% | 82.54% | 81.23% |
| Example 5 | 92.66% | 91.87% | 86.41% | 83.78% |
| Example 6 | 94.57% | 91.63% | 90.14% | 84.67% |
| Example 7 | 94.87% | 92.75% | 89.86% | 86.11% |
| Example 8 | 94.97% | 91.23% | 90.38% | 85.96% |

It may be seen from Table 2 and Table 3 that compared with Comparative Examples 1-4, the negative electrode plates prepared using the binder of Examples 1-4 have higher peel strength, which proves that adhesion of the binder can be increased after catechol is introduced into the binder. From the perspective of battery cycle and rate performance, Examples 1-4 are better than Comparative Examples 1-4. This is attributed to the introduction of catechol into the binder, so that a tight conductive network is formed in the negative electrode, to better facilitate electron transfer. In this way, under cycling and high rate currents, the conductive network of the electrode remains intact, so that a capacity retention rate is higher during cycling, an expansion rate of the negative electrode plate is lower, and rate performance is also higher. In comparison of Examples 1-4 with Comparative Example 5, although there is higher peel strength in Comparative Example 5, there are no groups that may conduct ions (as shown in A of FIG. 1), and an ionic conductivity in Comparative Example 5 is lower than that in Examples 1-4 and Comparative Examples 1-4. Therefore, each of the examples are better than Comparative Example 5. It may be seen that the binder in the present disclosure can well improve cycle stability of a lithium-ion battery, suppress cycle expansion, and in addition, and have relatively high rate performance.

The example embodiments of the present disclosure are described above. However, the scope protection of the present application is not limited to the foregoing embodiments. Any modifications, equivalent replacements, improvements, and the like made by a person skilled in the art within the spirit and principle of the present disclosure shall fall within the protection scope of the present disclosure.

What is claimed is:

1. A binder, wherein the binder comprises at least one polymer, and the polymer has a structure shown in Formula 1:

Formula 1

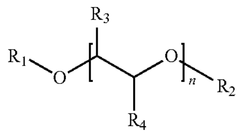

wherein in Formula 1, $R_3$ and $R_4$ are identical or different, and are independently selected from H, alkyl, substituted alkyl, or halogen, and n represents a quantity of repeated units; and end-capping groups $R_1$ and $R_2$ at both ends are identical or different, and are independently selected from H or a catechol group shown in Formula 2, and $R_1$ and $R_2$ are not both H:

Formula 2

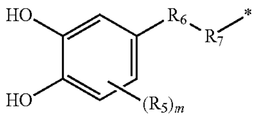

in Formula 2, $R_5$ is selected from at least one of alkyl, alkoxy, amine, aryl, or a halogen atom;

m is selected from 0, 1, 2, or 3;

$R_6$ is selected from an alkylene group, or an atom or a group forming a hybrid orbital, or does not exist;

$R_7$ is selected from —C(═O)— or —S(═O)(═O)—; and

* represents a linking end.

2. The binder according to claim 1, wherein $R_6$ is an atom or group forming a hybrid orbital.

3. The binder according to claim 1, wherein $R_1$ and $R_2$ are identical.

4. The binder according to claim 1, wherein n is an integer ranging from 50 to 200.

5. The binder according to claim 1, wherein an ionic conductivity of the binder ranges from $10^6$ $S\cdot cm^{-1}$ to $10^{-4}$ $S\cdot cm^{-1}$.

6. The binder according to claim 1, wherein the binder is a solution-type binder, and a solid content of the binder ranges from 4 wt % to 25 wt %.

7. The binder according to claim 6, wherein a viscosity of the solution-type binder ranges from 500 mPa·s to 100000 mPa·s.

8. A negative electrode plate, wherein the negative electrode plate comprises a negative electrode current collector and a negative electrode active layer located on at least one side of the current collector, the negative electrode active layer comprises a first binder, and the first binder is selected from the binder according to claim 1.

9. The negative electrode plate according to claim 8, wherein the negative electrode active layer further comprises a second binder, and the second binder is selected from at least one of an SBR emulsion, a styrene acrylic emulsion, or a polyacrylic acid binder.

10. The negative electrode plate according to claim 8, wherein a total mass of the first binder and the second binder accounts for 0.5 wt % to 5 wt % of a total solid mass of a negative electrode slurry.

11. The negative electrode plate according to claim 8, wherein a mass of the first binder accounts for 10% to 90% of a total mass of the first binder and the second binder.

12. A lithium-ion battery, wherein the lithium-ion battery comprises the binder according to claim 1.

13. The binder according to claim 1, wherein $R_1$ and $R_2$ are identical or different, and are independently selected from one of H or groups having structures shown in Formula 2-1 to Formula 2-8, and $R_1$ and $R_2$ are not both H:

2-1

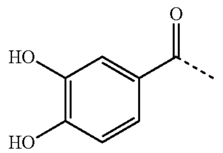

2-2

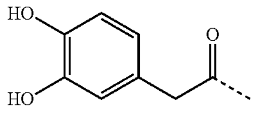

2-3

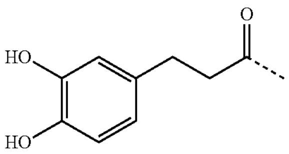

2-4

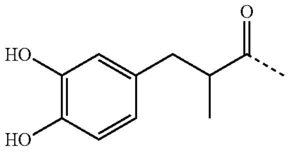

2-5

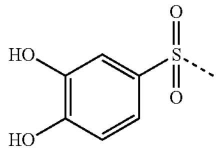

2-6

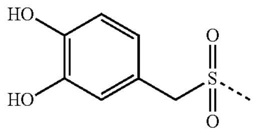

2-7

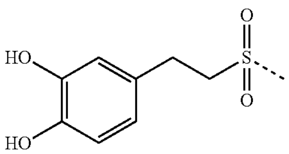

-continued 2-8

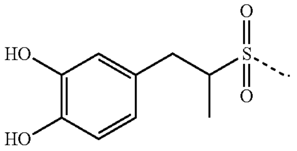

14. The binder according to claim 1, wherein $R_1$ and $R_2$ are identical or different, and are independently selected from one of groups having structures shown in Formula 3-1 to Formula 3-4, and $R_1$ and $R_2$ are not both H:

3-1

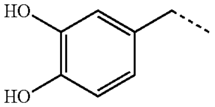

3-2

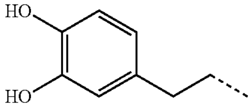

3-3

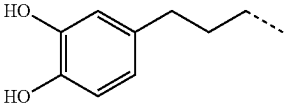

3-4

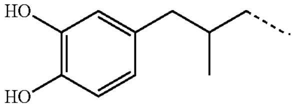

15. The binder according to claim 1, wherein $R_6$ is selected from —O—, —S—, —NH—, or

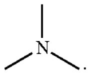

16. The binder according to claim 1, wherein $R_1$ and $R_2$ are identical or different, and are independently selected from groups having structures shown in Formula 4-1 to Formula 4-8, and $R_1$ and $R_2$ are not both H:

4-1

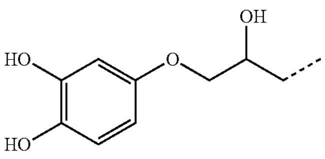

-continued 4-2

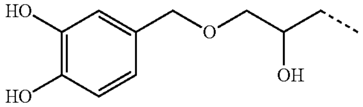

4-3

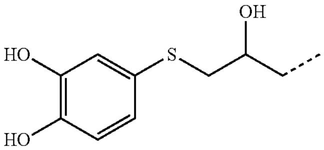

4-4

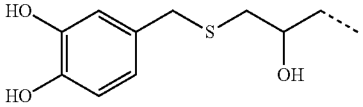

4-5

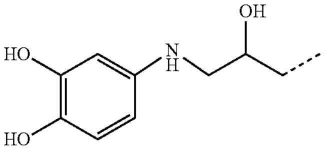

4-6

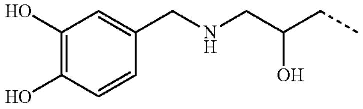

4-7

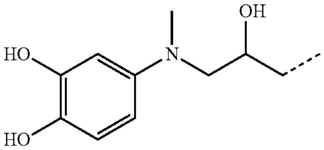

4-8

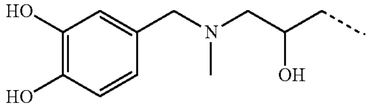

17. The binder according to claim 1, wherein n is an integer ranging from 20 to 1000.

18. The binder according to claim 1, wherein $R_3$ and $R_4$ are identical and are both H, and a main chain of the polymer is polyethylene glycol.

19. The binder according to claim 1, wherein a weight-average molecular weight of the binder ranges from $5\times10^3$ to $1000\times10^4$.

20. The binder according to claim 1, wherein a glass-transition temperature of the binder ranges from −70° C. to −40° C.

* * * * *